March 10, 1970 F. BUCKLEY 3,500,220

SENSE AMPLIFIER ADAPTED FOR MONOLITHIC FABRICATION

Filed Jan. 17, 1968 2 Sheets-Sheet 1

INVENTOR
FREDERICK BUCKLEY
BY John C Black
ATTORNEY

1

3,500,220

SENSE AMPLIFIER ADAPTED FOR MONOLITHIC FABRICATION

Frederick Buckley, Vestal, N.Y., assignor to International Business Machines Corporation, Armonk, N.Y., a corporation of New York Filed Jan. 17, 1968, Ser. No. 698,565
Int. Cl. H03f *3/42*
U.S. Cl. 330—19 7 Claims

ABSTRACT OF THE DISCLOSURE

The static operating current levels of first and second transistors are in part determined by a plurality of diodes in the form of transistors having their base-collector electrodes short-circuited and having a predetermined reference current flowing through them. Current sources are coupled to the emitter electrodes of each of the transistors. Third and fourth transistors have their emitter electrodes connected to a current source and their collector electrodes connected to respective emitter electrodes of the first and second transistors. Differential input signals to the third and fourth transistors produce variations in the collector currents in the first and second transistors. The collector currents of the first and second transistors and the additional reference current source are coupled to a single output node. When a predetermined positive or negative input signal level has been exceeded, the current in the output node reverses itself to produce an output signal.

BACKGROUND OF THE INVENTION

Field of the invention

The present application is particularly useful for sensing output signals from magnetic core storage devices and the like; it will be appreciated, however, that the invention is to be limited only to the extent set forth in the appended claims.

The improved sense amplifier is particularly well adapted for construction on a single semiconductor chip by known monolithic fabrication techniques; and in fact, to some extent, relies upon monolithic fabrication for optimum low-cost implementation. More specifically, the improved sense amplifier relies upon the economical fabrication of transistors with substantially matched base-emitter voltage-current characteristics which are readily achieved in monolithically fabricated structures on a single chip.

The improved sense amplifier can, with the exception of current sources which are applied to it, be fabricated solely of transistors. It is relatively insensitive to power supply variations; power dissipation is minimized; and since resistive elements are not required, the semiconductor chip size for a given circuit can be reduced increasing the yield for a given wafer. Because the signals are predominantly currents rather than voltages, transient performance is relatively insensitive to the function-capacitive environment on monolithic chips.

Description of the prior art

The sense amplifier of the present application makes use of certain of the teachings of copending United States patent application Ser. No. 513,395 of R. Ordower, filed Dec. 13, 1965, Patent No. 3,392,342, July 9, 1968, for a

2

"Transistor Amplifier with Gain Stability;" and said copending application is hereby incorporated herein by reference. Said copending application teaches the use of one or more diodes in the form of transistors having their base-collector electrodes short-circuited and connected across the base-emitter electrodes of one or more transistor amplifiers to control the current flowing in the amplifiers. The diodes and the transistor amplifiers must have base-emitter voltage-current characteristics matched as perfectly as practical to provide a ratio of total collector current to total diode current which is an inverse function of the number of diodes and a direct function of the total number of transistor amplifiers. For example, one diode and one amplifier provide a current ratio of one; two diodes and one amplifier provide a ratio of one-half; one diode and two amplifiers provide a ratio of two, and so on.

The sense amplifier of the present application makes use of this basic principle to control operating currents through various portions of the circuit.

The improved sense amplifier of the present application also makes use of certain of the teachings set forth in copending applications of James C. Greeson, Jr., Ser. No. 698,594 and Ser. No. 698,650, filed of even date herewith.

The Greeson, Jr., applications disclose a single translating device in the form of a first transistor connected in series with a second transistor having its base-collector electrodes short-circuited. Third and fourth series-connected transistors having their base-collector electrodes short-circuited are connected across the series circuit comprising the base-emitter junction of the first transistor and the second transistor. The base-emitter voltage-current characteristics of the transistors are substantially matched. A current source applied to the third and fourth transistors sets a fixed bias voltage from the base electrode of the first transistor to the emitter electrode of the second transistor. Changes in current through the second transistor produce variations in the emitter and collector currents of the first transistor. This basic four transistor arrangement is utilized in the improved sense amplifier of the present application.

Summary of the invention

A preferred form of the improved sense amplifier includes first and second transistor amplifiers of one conductivity type having their collector electrodes connected to an output node. The emitter electrodes are connected to their reference supply by way of third and fourth transistors of the same conductivity type having their base-collector electrodes short-circuited. Fifth and sixth transistors of the same conductivity type having their base-collector electrodes short-circuited are connected in series between the base electrode of the first and second transistors and the emitter electrodes of the third and fourth transistors.

A reference current is applied to the fifth and sixth transistors to determine in part the static operating current level of the first and second transistors.

Additional current sources are connected to the junctions between the first and third transistor and the second and fourth transistors.

Seventh and eighth transistors have their emitter electrodes connected to a source of reference current and their collector electrodes connected respectively to the junction between the first and third transistors and the second and fourth transistors. The base electrodes of the seventh and eighth transistors are adapted to receive differential input signals which in turn produce varying output currents in the first and second transistors.

An additional current supply is connected to said output node of the sense amplifier. When the sum of the collector output currents of the first and second transistors reaches a predetermined value incident to the differential input signal equaling or exceeding a predetermined positive or negative voltage level, the output current from the output node reverses direction. A utilization circuit senses the current reversal to produce an output signal.

In the preferred embodiment, all of the transistors identified above are of one conductivity type. In the preferred embodiment, each of the current sources comprises one or more diodes, in the form of transistors having their base-collector electrodes short-circuited, connected across the base-emitter electrodes of one or more transistor amplifiers to produce a total collector current which is substantially equal to the value of a reference current applied to the diodes, multiplied by the number of amplifiers and divided by the number of diodes.

Brief description of the drawings

The foregoing and other objects, features and advantages of the invention will be apparent from the following more particular description of preferred embodiments of the invention, as illustrated in the accompanying drawings.

Description of the preferred embodiments

Figure 1:
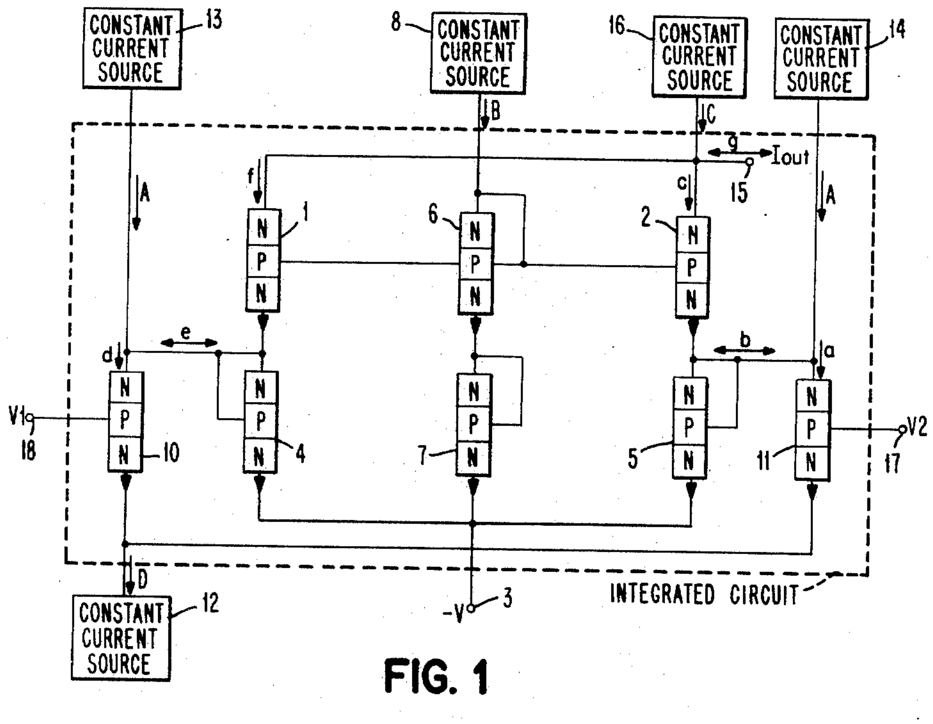
FIG. 1 illustrates partially in schematic form and partially in diagrammatic form one embodiment of the improved sense amplifier.

The improved sense amplifier of FIG. 1 includes NPN transistors 1 and 2 which have their base electrodes connected directly to each other and directly to the base electrode of an NPN transistor 6; and the emitter electrodes of the transistors 1 and 2 are connected to a negative supply terminal 3 by way of NPN transistors 4 and 5. Each of the transistors 4 and 5 has its base-collector electrodes short-circuited.

The transistor 6 and an NPN transistor 7 have their base-collector electrodes short-circuited and are connected in series between a first source of reference current 8 and the negative supply terminal 3. The transistors 6 and 7 are connected between the base electrodes of the transistors 1 and 2 and the emitter electrodes of the transistors 4 and 5. The base-emitter voltage-current characteristics of the transistors 1, 2 and 6 are substantially matched; and those of transistors 4, 5 and 7 are substantially matched. A selected value of current from the source 8 produces a voltage across the transistors 6 and 7. This provides a predetermined bias voltage at the base electrodes of each of the transistors 1 and 2. The current flowing through the transistors 4 and 5 will establish a voltage drop which, together with the bias voltages at the base electrodes of the transistors 1 and 2, determines the current flow through the transistors 1 and 2. For example, if the current flowing through the transistor 4 decreases, the voltage across the transistor 4 decreases, increasing the current through the transistor 1. Similarly, an increase in the current through the transistor 4 increases the voltage across the transistor causing a decrease in the current of transistor 1.

A pair of NPN transistors 10 and 11 are connected in the form of a differential amplifier having their emitter electrodes connected to a current source 12. The collector electrodes of the transistors 10 and 11 are connected respectively to constant current sources 13 and 14 and also to the junctions between the transistors 1, 4 and 2, 5, respectively.

Output current $g$ is derived from the output terminal 15. The collector electrodes of the transistors 1 and 2 are connected to said output terminal 15 and a constant current source 16 is also connected to the terminal 15. Input voltages V1 and V2 are applied to the input terminals 17 and 18.

Figure 3:
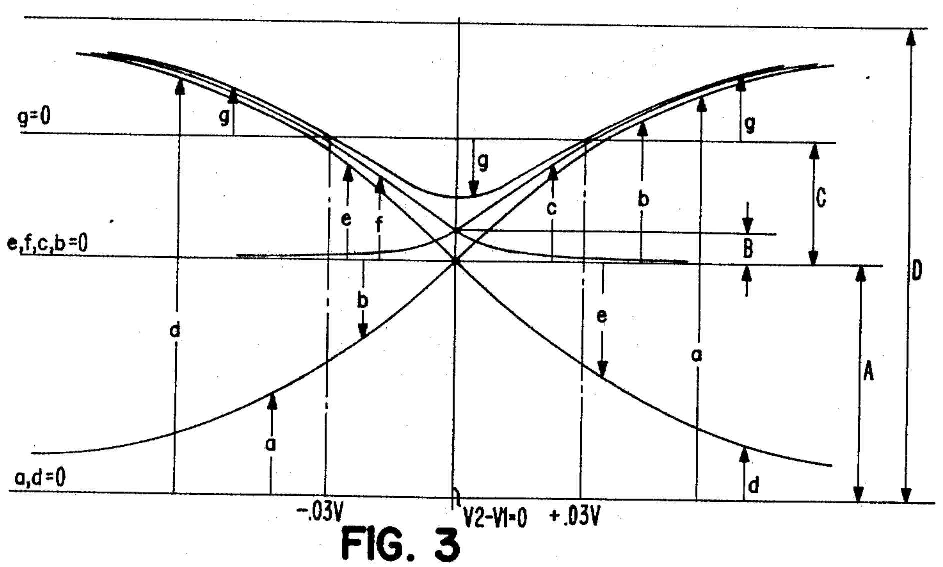
FIG. 3 includes various transfer relationships illustrating the manner in which the embodiment of FIG. 1 operates.

The transfer relationships of FIG. 3 illustrate the operation of the embodiment of FIG. 1 with selected current ratios for the outputs of current sources 8, 12, 13, 14 and 16. It will be appreciated that various current values and various other ratios may be selected for the various constant current sources. Note that all of the transistors must be operated in their linear regions, however.

In FIG. 3, each of the current sources 13 and 14 provides a current A which is arbitrarily defined as equal to one unit of current. The constant current source 12 provides a current D which is set equal to 2A, i.e., two units of current. The constant current source 16 supplies a current C equal to $A/2$, i.e., one-half unit of current; and the constant current source 8 supplies a current B equal to $A/8$, i.e., one-eighth unit of current. Thus the ratios of current are as follows: D equals 2A, A equals 2C and C equals 4B.

It will be seen from the transfer relationships of FIG. 3 that, when the voltages supplied to the input terminals 17 and 18 are equal to each other (i.e., the difference is equal to 0 volts), curents $a$ and $d$ are each equal to current A, the currents $e$ and $b$ are equal to 0, and the currents $f$ and $c$ are each equal to B whereby their sum is qual to 2B, and the output current $g$ is equal to 2B.

With no input signals applied, the above-describd static operating current levels are established as follows. Since D equals 2A, all of the current from sources 13 and 14 flows into the transistors 10 and 11. Consequently, the values of $b$ and $e$ are zero. The current B flowing into the transistors 6 and 7 produces a bias voltage across the series-connected base-emitter junctions of the transistors 1, 4 and 2, 5 to cause collector currents equal to those through transistors 6 and 7, i.e., B. Thus each current $f$ and $c$ equals B. Current $g$ equals $C-(f+c)$ or 2B flowing out of the output terminal 15.

As the voltage applied to the input terminal 17 becomes more positive than the voltage at the input terminal 18, the collector current $a$ of the transistor 11 increases from a value equal to A toward a value equal to D. Since the current $a$ is equal to the current A plus the current $b$, the current $b$ increases in value toward a maximum value equal to A. The increases in the current $b$ flowing into the transistor 11 is derived essentially from the transistor 2, whereby collector current $c$ increases toward a maximum value equal to A.

The input signals which cause an increase in current through the transistor 11 produce a corresponding decrease in the current through the transistor 10. Thus the value of the collector current $d$ of the transistor 10 begins to decrease toward zero as the level of the input signal increases. Since the constant current source 13 supplies a constant level A to the node between the transistor 10 and the transistors 1 and 4, the value of the current $e$ flowing into the transistor 4 begins to increase an amount equal to the decrease in the current $d$ This increase in the current through the transistor 4 produces a corresponding increase in the voltage drop across the transistor 4 therby reducing the base-emitter voltage drop across the transistor 1. This causes the collector current $f$ of the transistor 1 to decrease from a value equal to B toward 0.

It will be recalled that the output current $g$ flowing out of the output node is equal to $C-(f+c)$. It can be seen from FIG. 3 that the value of $c$ is increasing at a rate faster than the decrease in the value of the current $f$. Thus at a predetermined threshold level (in this case, plus .03 volt) the value of $g$ equals zero. At this input voltage level, the sum of $f$ and $c$ is equal to C. As the input voltage differential is increased beyond this value in the positive direction, the current $g$ reverses its direction and increases toward a maximum value of C.

When the input voltage level at terminal 17 becomes more negative than the input voltage level at the terminal 18, the collector current $d$ of the transistor 10 begins to increase and the collector current $a$ of the transistor 11 begins to decrease. The increasing current $d$ is accompanied by a corresponding and equal increase in the current $e$ derived essentially from the transistor 1. This results in less current from the transistor 1 flowing into the transistor 4 which produces a corresponding decrease in the voltage drop across the transistor 4 and an increase in the base-emitter bias voltage of the transistor 1. Thus the level of the collector current $f$ of the transistor 1 begins to increase toward a maximum value equal to A.

At the same time, the decrease in the value of the current $a$ results in a corresponding equal increase in the current $b$, this current flowing from the source 14 into the transistor 5. The increase in the current flowing through the transistor 5 produces a corresponding increase in the voltage drop across the transistor 5 and a decrease in the bias voltage across the base-emitter junction of the transistor 2. This results in a decrease in the value of the collector current $c$ of the transistor 2 from a value equal to B toward 0.

When the sum of the currents $c$ and $f$ is equal to C, the level of the output current $g$ is equal to zero and a further increase in the input voltage difference results in a reversal of the polarity of the current $g$.

Figure 2:
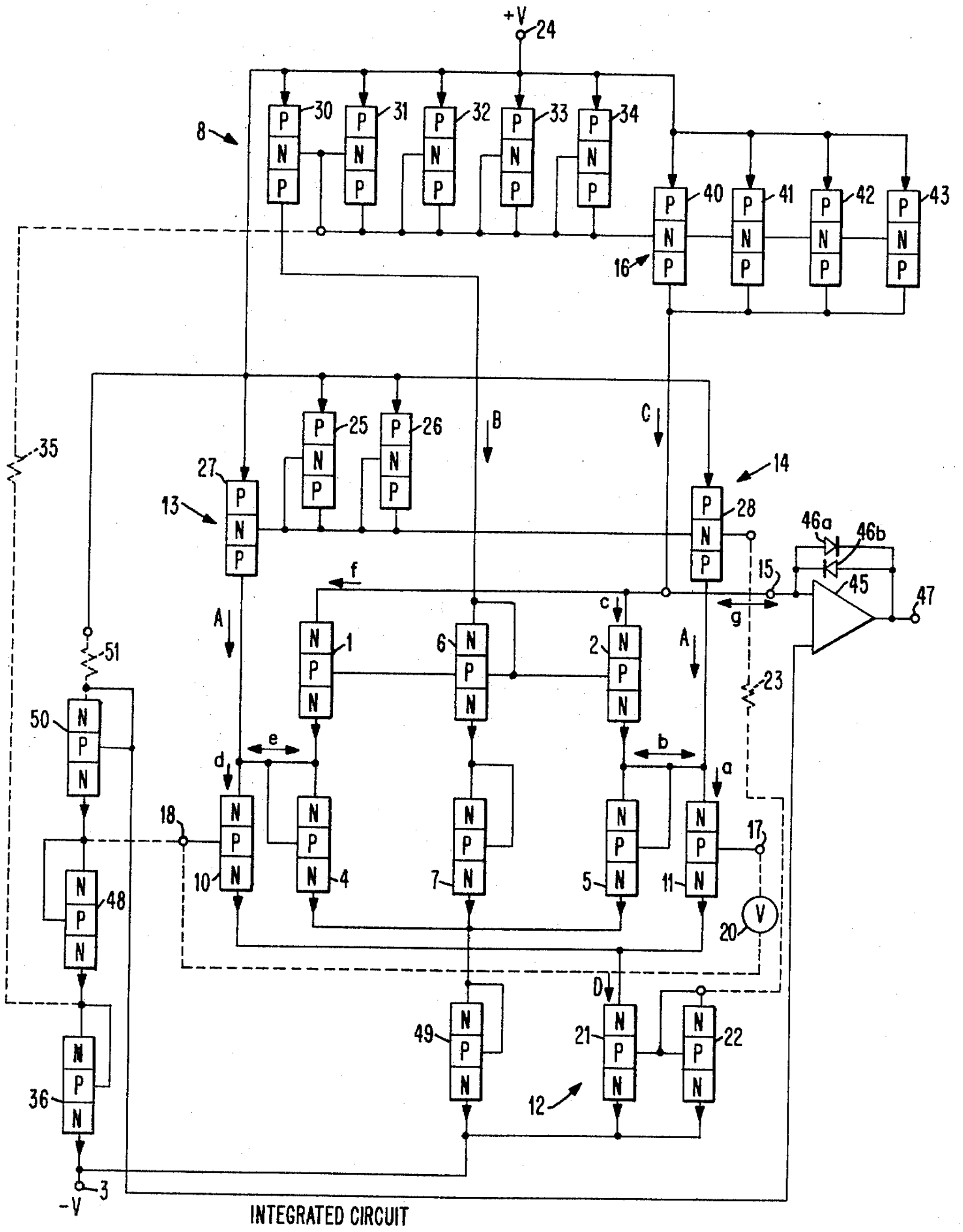
FIG. 2 illustrates schematically a preferred form of the improved amplifier, further implementing the embodiment of FIG. 1.

FIG. 2 illustrates one preferred form of further implementing the improved sense amplifier of FIG. 1 and corresponding components will be assigned the same reference numerals. Thus the sense amplifier of FIG. 2 includes a pair of input transistors 10 and 11 having their input terminals 18 and 17 adapted for connection with a source of differential voltage 20. Transistors 6 and 7 have their base-collector electrodes short-circuited and are connected to transistor pairs 1, 4 and 2, 5 to control the bias currents therethrough. Transistors 4 and 5 also have their base-collector electrodes short-circuited. Output signals are derived from the terminal 15 to which the collector electrodes of the transistors 1 and 2 are connected.

FIG. 2 illustrates on method of fabricating the constant current sources 8, 12, 13, 14 and 16. The current source 12 is in the form of an NPN transistor 21 having its collector electrode connected to the emitters of the transistors 10 and 11 and its emiter electrode connected to the negative supply terminal 2. An NPN transistor 22 having its base-collector electrodes short-circuited is connected across the base-emiter terminals of the transistor 21 to cause the collector current of the transistor 21 to be substantially equal to the current flowing into the transistor 22. In order to achieve this desired result, the base-emitter voltage-current characteristics of the transistors 21 and 22 must be matched as perfectly as is practical. The current flowing into the transistor 22 is determined essentially by the value of a resistor 23 which is connected to the collector electrode of the transistor 22 and to the positive supply terminal 24 by way of a pair of parallel-connected PNP transistors 25 and 26 having their base-collector electrodes short-circuited. The value of the current flowing into the transistor 22 will be equal to the difference between the positive and negative supply potentials less two diode drops divided by the value of the resistor 23. If we assume this value of current to be two units, it will be appreciated that the current D flowing in the collector electrode of the transistor 21 will also be equal to two units of current.

These two units of current divide equally in the transistors 25 and 26 producing one unit of current in each of the latter transistors. The latter transistors are connected in parallel with the base-emitter junctions of PNP transistors 27 and 28. The transistor 27 forms the constant current source 13 and the transistor 28 forms the constant current source 14. Each of the transistors 25, 26, 27 and 28 have substantially matched base-emitter voltage-current characteristics whereby the collector currents in each of the transistors is substantially equal. Since each of the transistors 25 and 26 has one unit of current flowing therethrough, each of the transistors 27 and 28 will have one unit of current flowing from their collectors. Thus the current levels A are each equal to one unit of current.

The current source 8 comprises a PNP transistor 30 having its emitter electrode connected to the positive supply terminal 24 and its collector electrode connected to the transistor 6. A plurality of PNP transistors 31, 32, 33 and 34 each have their base-collector electrodes short-circuited and each is connected in parallel with the base-emitter junction of the transistor 30. Each of the transistors 30–34 inclusive has substantially matched base-emitter voltage-current characteristics whereby the collector currents of the transistors are substantially equal.

The level of current flowing through the transistors 31–34 is determined by a resistor 35 which is connected to the transistors 31 and 34 and to the negative supply terminal 3 by way of an NPN transistor 36. The current flowing through the transistor 36 and the resistor 35 divides equally between the transistors 31–34 inclusive. Thus each of the transistors 31–34 carries one-fourth of the current delivered by the resistor 35. Consequently, the transistor 30 collector current is equal to one-fourth the current flowing through the resistor 35.

The transistors 31–34 inclusive are also connected across the base-emitter junctions of parallel transistors 40–43 inclusive which comprise the constant current source 16. Since the number of transistors 40–43 are equal in number to the transistors 31–34, the total collector current of the transistors 40–43 inclusive is equal to the total current in transistors 31–34, i.e., the current flowing through the resistor 35. Thus the current B flowing in the transistor 30 is equal to one-fourth C, the current flowing through the transistors 40–43 inclusive. Assuming it is desired in FIG. 2 to produce current ratios which are the same as those illustrated with respect to FIG. 3, the resistor 35 must have a value which is equal to twice the value of the resistor 23 in order to provide a current C which is equal to one-half of the value of current A.

It will be appreciated that the base-emitter voltage-current characteristics of the transistors 40–43 inclusive substantially match those of the transistors 31–34 inclusive and that their beta is high to obtain the desired current relationships.

The output terminal 15 of the sense amplifier is connected to any known suitable utilization circuit, for example, a differential amplifier 45 having negative feedback oppositely poled diodes 46$a$, 46$b$. Current signals at the terminal 15 are translated into voltage signals of one or the other of two levels at the output terminal 47 of the amplifier 45 as a function of the polarity of the current at terminal 15.

The transistor 36 and a second NPN transistor 48 having its base-collector electrodes short-circuited set the base electrodes of the transistors 10 and 11 at two diode drops above the negative supply level, whereby the emitter electrodes of the transistors 10 and 11 are approximately one diode drop above the negative supply. This assures operation of the transistor 21 at a level below saturation. The collector electrodes of the transistors 10 and 11 are maintained substantially two diode drops above the negative supply terminal 3 by means of the transistors 4 and 5 and an additional NPN transistor 49 having its base-collector electrodes short-circuited. This prevents operation of the transistors 10 and 11 in saturation.

The output terminal 15 is held approximately at three diode drops above the negative supply by means of the connection of the opposite input to the differential amplifier 45 to the transistors 36, 48 and an additional NPN transistor 50 having its base-collector electrodes short-circuited. A resistor 51 connected between the positive supply terminal 44 and the transistor 50 provides a desired bias current to the transistors 48 and 50 and together with resistor 35 to the transistors 36 to set desired voltage drops across the transistors.

This potential of three diode drops above the negative supply at the terminal 15 exists at the collector electrodes of the transistors 1 and 2. Transistors 6, 7 and 49 set the base electrodes of the transistors 1 and 2 at three diode drops above the negative supply, preventing saturation in the transistors 1 and 2.

Transistors of opposite conductivity type with suitable polarity changes in the supply can be used in the embodiments of FIGS. 1 and 2.

Other known means for providing constant current can be used.

The transistors 4, 5 and 7 of FIGS. 1 or 2 can be PNP conductivity types with their emitter electrodes connected to the emitter electrodes of the transistors 1, 2 and 6, respectively, and their base and collector electrodes returned to the negative supply terminal.

I claim:

1. A transistor circuit having an output terminal and formed on a single semiconductor chip for detecting threshold levels of either polarity of signals applied to input terminals thereof comprising a first circuit including first and second transistors with their base-emitter circuits connected in series;

a second circuit including third and fourth transistors with their base-emitter circuits connected in series;

the first and third transistors having collector electrodes connected to each other and to the output terminal;

fifth and sixth transistors having their base-collector electrodes short-circuited and having their base-emitter circuits connected in series;

the series-connected base-emitter circuits of the first and second transistors of the third and fourth transistors and of the fifth and sixth transistors being connected in parallel with each other;

the first, third and fifth transistors being of a predetermined conductivity type and having substantially matching base-emitter voltage-current characteristics;

the second, fourth and sixth transistors being of a predetermined conductivity type and having substantially matching base-emitter voltage-current characteristics;

the fifth and sixth transistors adapted when connected to a first reference current means to at least partially determine the static operating currents of the first and third transistors as a function of the reference current level;

a differential amplifier including seventh and eighth transistors adapted to conduct at substantially equal current levels when their emitter electrodes are connected to a second reference current means and when their collector electrodes are each connected to a respective third and fourth reference current means and further adapted when their base electrodes are connected to a differential input signal source to vary their collector currents as a function of the input signal;

the junction between the series-connected base-emitter circuits of the first and second transistors being connected to the collector electrode of the seventh transistor and the junction between the series-connected base-emitter circuits of the third and fourth transistors being connected to the collector electrode of the eighth transistor for producing in the collector electrodes of the first and third transistors currents which are a function of variations in the collector currents of the seventh and eighth transistors; and said transistor circuit adapted when the collector electrodes of the first and third transistors and the output terminal are connected to a fifth reference current means to produce at the output terminal a predetermined change in signal in response to selected changes in the collector currents of the first and third transistors.

2. The transistor circuit of claim 1 wherein all of the transistors are of the same conductivity type, and wherein the base-collector electrodes of the second and fourth transistors are each short-circuited.

3. The transistor circuit of claim 2 wherein all of the transistors are adapted when connected to said reference current means to operate in their linear regions.

4. A sense amplifier having input signal terminals and an output terminal and comprising a first circuit including first and second transistors with their base-emitter circuits connected in series;

a second circuit including third and fourth transistors with their base-emitter circuits connected in series;

the first and third transistors having collector electrodes connected to each other and to the output terminal;

fifth and sixth transistors having their base-collector electrodes short-circuited and having their base-emitter circuits connected in series;

the series-connected base-emitter circuits of the first and second transistors of the third and fourth transistors and of the fifth and sixth transistors being connected in parallel with each other;

the first, third and fifth transistors being of a predetermined conductivity type and having substantially matching base-emitter voltage-current characteristics;

the second, fourth and sixth transistors being of a predetermined conductivity type and having substantially matching base-emitter voltage-current characteristics;

a first means connected to and supplying a constant current to the fifth and sixth transistors to at least partially determine the static operating currents of the first and third transistors as a function of the constant current level;

second and third constant current means;

a fourth constant current means;

a differential amplifier including seventh and eighth transistors having emitter electrodes connected to the fourth constant current means, having collector electrodes each connected to a respective one of the second and third constant current means and having base electrodes connected to the input signal terminals to vary their collector currents as a function of the input signals; and means connecting the junction between the base-emitter circuits of the first and second transistors to the collector electrode of the seventh transistor and connecting the junction between the base-emitter circuits of the third and fourth transistors to the collector electrode of the eighth transistor for producing in the collector electrodes of the first and third transistors current variations as a function of collector current variations in the seventh and eighth transistors.

5. The sense amplifier of claim 4 wherein all of the transistors are of the same conductivity type, and wherein the base-collector electrodes of the second and fourth transistors are each short-circuited.

6. The sense amplifier of claim 5 further comprising means operating the transistors in their linear regions.

7. The sense amplifier of claim 4 wherein each of the constant current means comprises one or more diodes, in the form of transistors having their base-collector electrodes short-circuited, connected across the base-emitter junctions of one or more transistor amplifiers, said transistors having substantially matched base-emitter voltage-current characteristics for producing a ratio of total amplifier collector current to diode current which is directly proportional to the number of amplifiers and inversely proportional to the number of diodes, and means supplying current of a desired level to the diodes of each constant current means.

References Cited

UNITED STATES PATENTS 3,315,089 4/1967 Mayhe ----------- 330—30 X

NATHAN KAUFMAN, Primary Examiner

U.S. Cl. X.R.

330—14, 24, 38